Figure 1:
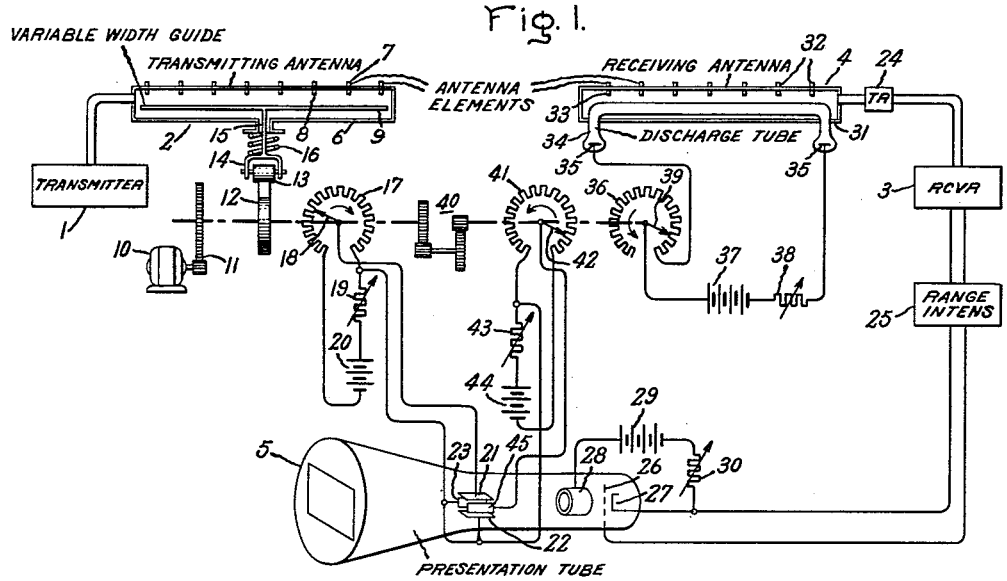

July 12, 1955

M. D. FISKE 2,713,161

RADAR SCANNING SYSTEM

Filed July 27, 1949

Inventor:
Milan D. Fiske,
by Richard E. Hosley
His Attorney.

United States Patent Office 2,713,161
Patented July 12, 1955

2,713,161

RADAR SCANNING SYSTEM

Milan D. Fiske, Burnt Hills, N. Y., assignor to General Electric Company, a corporation of New York Application July 27, 1949, Serial No. 107,037

5 Claims. (Cl. 343—100)

My invention relates to object locating systems and more particularly to a scanning system suitable for use in object locating systems employing ultra high frequency electromagnetic waves.

In such object locating systems, commonly called radar systems, the relative range and bearing of an object is usually determined by transmitting periodically recurring pulses of electromagnetic energy toward the object and measuring the time interval between each transmitted pulse and a reflected echo signal as well as the direction of maximum echo signal strength. In order to determine the true bearing of an object, it is necessary to obtain directional information in at least two dimensions such as azimuth and elevation. Such two dimensional bearing information may be obtained by confining either or both the transmitted energy pattern or the received energy pattern to a narrow highly directive sector or beam which may be varied in a known manner with time in order to scan the entire volume of a relatively wide spatial sector. The movement of such transmitted or received energy patterns may be correlated with an indication system to show the bearing of an object from which the echo signal is received. This directional variation of a transmitted beam of electromagnetic energy is commonly referred to as "transmitter scanning" while the directional variation of a narrow maximum sensitivity pattern of a receiving antenna array is commonly referred to as "receiver scanning."

It is apparent that the efficiency of such scanning systems is directly related to the scanning frequency, i. e., the number of times per second that the energy pattern sweeps through a particular sector. With low scanning frequencies, for example, it becomes exceedingly difficult to track high speed objects, such as guided missiles, moving across the field of search because of the great distance that such high speed objects can travel during the time interval between each sweep. Many difficult problems, however, are encountered in providing a scanning system having a high scanning frequency. Purely mechanical propulsion systems adapted, for example, to oscillate an antenna assembly or to change the critical dimensions of an associated wave guide are limited by physical strength and mechanical vibration to scanning frequencies in the order of 1 to 10 sweeps per second; and electronic scanning systems which have heretofore been devised commonly require a considerable amount of complicated and expensive electronic equipment.

Accordingly, it is an object of my invention to provide a radar scanning system which provides immediate two dimensional bearing information upon an object located within a predetermined relatively wide field of search.

Another object of my invention is to provide a receiver scanning system adapted for use in object locating systems which scans electronically through a relatively wide spatial sector at a high scanning frequency.

A further object of my invention is to provide a receiver scanning system adapted for use in object locating systems which has a high scanning frequency and yet is simple and economical to construct.

It is well known that transmitter and receiver scanning may be accomplished by varying mechanically the critical dimensions of an electromagnetic wave guide containing a linear array of axially spaced antenna elements, such as dipoles, excited through stubs inserted into the wave guide. The variation of the dimensions of the wave guide causes a corresponding change in the velocity of phase propagation, commonly called the "phase velocity" of the electromagnetic wave within the guide; and consequently, for a given frequency of operation, the wave length of the propagated wave, commonly referred to as as the "phase wave length," is varied accordingly. The relationship between the phase wave length and the spacing between the antenna elements determines the direction of maximum radiation or reception of electromagnetic energy. If, for example, the phase wave length is equal to the spacing between the antenna elements, the phase of the propagated wave arriving within the guide at each antenna element is the same, and a lobe of maximum energy is radiated or received from a direction normal to the array. If, however, the phase wave length is slightly greater or less than the antenna element spacing, the phase separation is not equal and maximum energy is radiated or received from a direction to the right or left of the normal depending upon the direction of wave propagation within the guide and the magnitude of the phase separation.

One of the principal features of my invention is the provision of electric means for controlling the phase velocity of the electromagnetic wave within a wave guide antenna system, such as described above, without altering the dimensions of the guide, with the result that much higher scanning frequencies are obtainable.

It is well known that the propagation characteristics of an electromagnetic wave within a wave guide is dependent not only upon the dimensions of the guide but also upon the medium or dielectric within the guide. The relative effect of a change in this medium is mathematically expressed in terms of a dielectric constant $\epsilon$. One means of obtaining the effective variation of this dielectric constant in order to control electromagnetic wave propagation within a wave guide has recently been described and claimed in application Serial Number 454,710, filed on August 12, 1942 in the name of Simon Ramo, now Patent No. 2,683,251 issued July 6, 1954 and assigned to the same assignee as the present invention; and comprises the production of a region of electrically charged particles, such as electrons or ions, within the guide. The charge density of this region determines the dielectric constant and can be varied to control the wave propagation characteristics. In the present invention, I employ this phenomenon to control the phase separation of antenna elements axially mounted on a wave guide in order to obtain an electrically controlled receiver scanning system of high scanning frequency.

Figure 2:
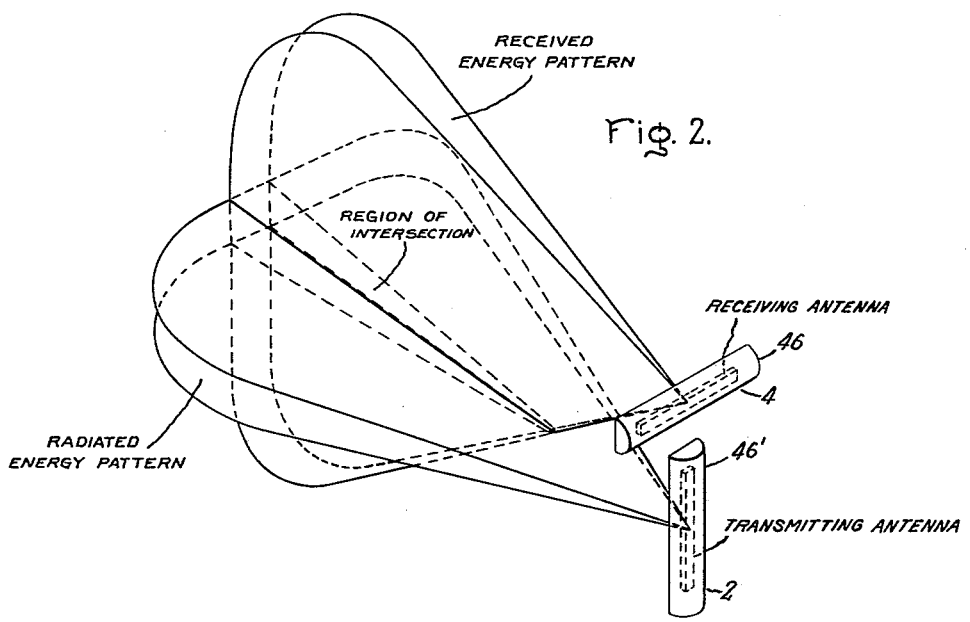
Figure 3:
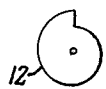

The novel features which I believe to be characteristic of my invention are set forth with particularity in the appended claims. My invention itself, however, together with further objects and advantages thereof can best be understood by reference to the following description taken in connection with the accompanying drawing in which Fig. 1 is a simplified schematic diagram of a radar system embodying my invention;

Fig. 2 is a perspective view of typical radiated and received energy patterns obtained in the radar system of Fig. 1; and, Fig. 3 is a side view of a cam employed in the transmitting antenna system of Fig. 1.

Referring to Fig. 1, I have shown a radar system the principal elements of which include a transmitter 1, a transmitting antenna 2, a receiver 3, a receiving antenna 4 and a signal indicating device, such as a cathode ray presentation tube 5. The transmitting antenna 2 is a conventional type and comprises a wave guide 6 properly constructed for electromagnetic wave propagation at the frequency of transmission and containing a plurality of equally spaced antenna elements such as dipoles 7 mounted on one side along the length of the guide and excited by the electromagnetic wave within the guide through antenna element stubs 8 inserted transversely within the volume of the guide. A movable septum or partition 9 is located within the guide 6 and extends close to the interior walls of the guide but is not fastened thereto. The septum 9 is commonly constructed to have folded-back sides (not shown in the drawing) which extend a quarter wave length back within the guide and function as a radio frequency choke to make radio frequency contact to the sides of the guide and to permit a variation of the cross-sectional dimensions of the guide by a transverse movement of the septum toward or away from the antenna elements.

In order to produce this transverse movement of the septum 9, I preferably provide a motor 10 which is connected through a gear train 11 to rotate an eccentric cam 12, best seen in Fig. 3. A roller 13 which rides on the cam 12, is suspended between the arms of a bifurcated rod 14 which is connected through a suitable aperture 15 in the wave guide 6 to the septum 9. A spring 16 or other suitable resilient member is inserted between the bifurcated end of the rod 14 and the wave guide 6, and functions to press the roller 13 firmly against the cam 12.

In order to provide a transmitter scanning action which may be easily synchronized to the movement of the beam of a suitable indicating device, such as the cathode ray tube 5, I preferably construct the cam 12, as illustrated in Fig. 3, to have an outer circumference which forms one spiral-type revolution cut off by a radial line from the beginning of the spiral to the end thereof. The septum 9 is propelled toward the antenna elements 7 by the rotation of this cam 12 and thereby diminishes the dimensions of the guide until the end of the spiral is reached, whereupon the septum 9 is forced by the tension of spring 16 to move rapidly back to its furthermost position relative to the antenna elements 7. This cyclical movement is repeated at a frequency depending upon the speed of the motor 10 and the gear ratio of the gear train 11.

In order to produce a voltage representing the movement of the septum 9 and consequently the movement of the transmitted beam itself, I preferably provide a circular potentiometer 17, whose movable arm 18 passes rapidly from a point of maximum resistance at one end of the potentiometer 17 to a point of minimum resistance at the other end thereof during the same period of time that the inner dimensions of the wave guide 6 change from minimum to maximum because of the movement of the septum 9. The potentiometer 17 is preferably connected as a voltage divider network together with a variable resistance 19 and a source of unidirectional voltage, such as battery 20. The movable arm 18 of the potentiometer 17 is directly connected to one of the horizontally positioned deflecting plates 21 of the cathode ray tube 5, while the junction point between potentiometer 17 and variable resistance 19 is directly connected both to the opposite deflecting plate 22 and to one of the vertically extending deflecting plates 23. As the movable arm 18 rotates toward the end of the potentiometer 17 which is connected to the rheostat 19, the variation in voltage across the horizontally positioned deflecting plates causes the beam to be deflected vertically.

In the receiving system, the echo signal of electromagnetic energy is received by the receiver antenna 4 and supplied through a transmit receive or T. R. device 24 to the pulse receiver 3. The transmit receive device 24 may be any conventional type constructed to disconnect the receiver 3 from the receiver antenna 4 only during the pulse transmission period in order to protect the delicate receiver equipment from the intense transmitted voltage. The amplified signal voltage output of the receiver 3 may be connected to a signal intensity measuring and controlling circuit, commonly called a range intensity circuit and designated in Fig. 1 by block 25. The output of this range intensity circuit 25 is connected between a grid 26 and a cathode 27 of the cathode ray tube 5 in order to control the intensity of the electron discharge in accordance with the received signal strength. The proper beam accelerating voltage is applied to an anode 28 of the cathode ray tube 5 by virtue of a source of high potential 29 and a variable resistance 30 connected in series from the anode 28 to the cathode 27.

The receiving antenna 4 also comprises a wave guide 31 containing a plurality of longitudinally spaced receiving antenna elements, such as dipoles 32 preferably mounted on one side of the wave guide 31 and arranged to excite the guide by such means as antenna element stubs 33 inserted within the volume of the guide.

In order to establish a controllable region of electrically charged particles within the guide 31, I preferably provide a gas filled discharge device 34 extending longitudinally within the guide 31 and having suitable discharge controlling electrodes 35 located at each end of the discharge device 34. The discharge device 34 is preferably filled with an inert gas, such as argon, at relatively low pressure and is constructed to project out of the guide at either end in order to provide a central region of substantially uniform ionization within the guide 31.

It is to be understood that although I preferably employ a longitudinally positioned gas filled device 34 to establish a region of electrically charged particles within the wave guide 31, many other means of establishing a controllable region of electrically charged particles either longitudinally or transversely within the guide may alternatively be provided. Means, well known to the art, for producing a properly focused axial or transverse electron stream may be employed, or the wave guide itself may be filled with a suitable gas and an ionizing discharge current established from one side or end of the wave guide to an opposite side or end respectively. For optimum performance, however, it is desirable that the region of electrically charged particles have substantially uniform charge density along the axis of the wave guide portion containing the receiving antenna elements 32.

In order to control the density of the electrically charged region within the gas discharge device 34, I preferably provide a circular rheostat 36 connected in series with the source of electrical potential 37 and a variable resistance 38 from one electrode 35 of the discharge device 34 to the other electrode 35 thereof. Once the variable resistance 38 is properly adjusted, the voltage at the electrodes 35 and consequently the ionizing discharge current through the device 34 is dependent upon the position of the movable arm 39 of the rheostat 36. The motor 10 may be connected, as illustrated diagrammatically in Fig. 1, through an additional gear train 40 to rotate the movable arm 39 of the rheostat 36 at a much higher speed than the movable arm 18 of the potentiometer 17. Although, for reasons of convenience and economy, I preferably employ the same motor 10, it will be appreciated that a separate high speed motor may be employed to rotate the arm of rheostat 36 since there is no necessary correlation between the position of the arm 39 of rheostat 36 and the position of the arm 18 of potentiometer 17.

In order to synchronize the deflection of the electron beam of the cathode ray presentation tube 5 to the scanning action of the receiving antenna, I preferably provide another circular potentiometer 41 whose movable arm 42 is propelled by motor 10 to rotate together with the movable arm 39 of rheostat 36. The potentiometer 41 is serially connected in a voltage dividing network comprising a variable resistance 43 and a source of electrical potential 44. The movable arm 42 is connected to the remaining vertically positioned deflecting plate 45 of the cathode ray tube 5 while the junction of potentiometer 41 and rheostat 43 is directly connected to the same deflection plates as the movable arm 18 of potentiometer 17.

In the operation of my invention, the transmitting antenna 2 and the receiving antenna 4 are supported along orthogonal axes and facing in the same direction. One convenient arrangement, illustrated in Fig. 2, is to dispose the transmitting antenna 2 in a vertically extending position and to locate the receiving antenna 4 in a horizontally extending position immediately above the transmitting antenna 2. Radiation directing reflectors 46 and 46' are preferably located immediately behind the receiving and transmitting antennas respectively. Ultra high frequency electromagnetic energy in the form of periodic high voltage pulses is delivered from the transmitter 1 to the transmitting antenna 2 from which it is radiated in the form of a fan-shaped beam pattern diagrammatically illustrated in Fig. 2. The elevational position of this radiated energy pattern depends upon the position of the septum 9 within the transmitting antenna wave guide 6. The actual shape of the transmitting beam is a function of the number and spacing of the antenna elements 7 as well as of the curvature of the reflectors 46.

As explained previously, the direction of radiation is a function of the frequency of transmission, the spacing between the dipoles, and the phase wave length within the guide. Mathematically expressed the angle $\theta$ which the radiated beam makes with the line passing perpendicularly through the center of the antenna array can be found from the relation;

$$\sin \theta = \lambda \left[ \frac{1}{\lambda_g} - \frac{n}{s} \right] \qquad (1)$$

where $n$ is any integer, $s$ is the spacing between the antenna elements, $\lambda$ is the wave length in free space and $\lambda_g$ is the phase wave length within the guide.

It is apparent from the above Relation (1) that whenever the spacing $s$ between the antenna elements is equal to an integral multiple of the phase wave length $\lambda_g$, there is a radiated beam in a direction normal to the array since there is a value of $n$ which will cause the sine of $\theta$ to be equal to zero.

The phase length $\lambda_g$, in turn, is a function, together wtih other parameters, of the dimensions of the wave guide and can be determined from the formula:

$$\lambda_g = \frac{2\pi}{\beta} \qquad (2)$$

where $\beta$ is the phase constant determinable from the relation $$\beta = \left[ w^2 u_1 \epsilon_1 - \left(\frac{n\pi}{a}\right)^2 - \left(\frac{m\pi}{b}\right)^2 \right]^{\frac{1}{2}} \qquad (3)$$

where $w$ is the angular velocity of the propagated wave, $u_1$ is the permeability of the medium, $\epsilon_1$ is the dielectric constant, $a$ is the height of the guide, $b$ is the width of the guide and $n$ and $m$ represent the order and mode of propagation respectively within the guide.

An inspection of Equation (3) reveals that as the dimensions $a$, $b$, of the guide are increased, the phase constant $\beta$ is also increased and the phase wave length $\lambda_g$ is decreased accordingly with the result that the sine $\theta$ varies in a negative direction indicating an angular displacement of the radiated beam pattern in a particular direction, such as counterclockwise. However, on the other hand, if the dimensions of the guide are decreased, the phase wave length is increased and the radiated pattern is displaced in an opposite direction, such as clockwise.

As the cam 12 is rotated at a substantially uniform speed by the motor 10, the wave guide dimensions are continually decreased during the major spiraling portion of the cam and are then abruptly increased to maximum dimensions when the radially cut-back position of the cam is passed. As a result, the radiated beam from the transmitting antenna 2, positioned as illustrated in Fig. 2, moves relatively slowly in a vertical direction, such as upward, from a minimum point corresponding to the minimum radial point along the circumference of the cam 12 until a maximum deviation is obtained which corresponds to the maximum radial point along the circumference of the cam 12. Further rotation of the cam causes the radiated energy pattern to swing rapidly back to its initial position.

The deflection of the radiated energy pattern is correlated to the deflection of the electron beam in the cathode ray tube 5 by the rotation of the movable arm 18 of the circular potentiometer 17 which is mechanically connected to rotate together with cam 9. The rotation of the movable arm 18 produces a saw-toothed shaped voltage between the horizontally extending deflecting plates 21 and 22 which causes the electron beam to move from an initial point on the screen corresponding to the minimum voltage point along the circumference of the potentiometer 17 until a maximum deviation is attained which corresponds to the maximum voltage point of the potentiometer 17. Further rotation of the potentiometer arm 18 causes the electron beam of the cathode ray tube 5 to swing back to its initial position. The range of deviation can be adjusted by varying the magnitude of variable resistance 19.

As will be appreciated from an inspection of Equations (1), (2), and (3), the movement of the radiated beam does not vary in direct proportion to a change in the dimensions of the wave guide, but rather, it varies non-linearly with respect thereto. If a linear movement of the radiated beam is desired, the cam 12 may be easily constructed from empirical or mathematical data to have a proper non-linear rate of radial increase along its spiral circumference, and the potentiometer 17 may be constructed to have a linear rate of resistive increase in order to synchronize the movement of the electron beam to the resultant linear movement of the radiated electronic beam. If, on the other hand, the dimensions of the wave guide are varied at a linear rate by a cam 12 constructed to have a linear rate of increase, the potentiometer 17 may be constructed to have a proper non-linear rate of resistive increase in order to accomplish this synchronization.

In the receiving antenna assembly, the scanning function is accomplished by controlling the ionization current in the gas discharge tube 34 rather than by a change in the dimensions of the wave guide 31. As indicated by Equation (3) the phase constant $\beta$ is a direct function of the dielectric constant $\epsilon$. By producing a region of electrically charged particles within the guide, the magnitude of this dielectric constant $\epsilon$ is reduced to a value less than unity which is dependent upon the density of the electrically charged region and consequently upon the magnitude of the ionizing discharge current. If the discharge current is increased, the value of the dielectric constant $\epsilon$ becomes smaller and causes a corresponding decrease in the phase constant $\beta$. As is readily discernible from Equation (2), a decrease in phase constant $\beta$ produces an increase in phase wave length with the result that for a given antenna element spacing $s$, the receiving antenna has maximum sensitivity to echo signals incident upon the array from continually varying directions in the field of search in a manner such that the maximum response pattern of the receiving antenna scans through the field in a particular rotational direction such as counterclockwise. The movement of this maximum response pattern of the receiving antenna is, therefore, directly dependent upon the change in the ionizing discharge current within the discharge tube 34.

In the instant embodiment of my invention this discharge current is controlled by the rotation of the movable arm 39 of rheostat 36. When the arm 39 is at the point of minimum resistance, the voltage at the electrodes 35 is maximum and causes maximum discharge current through the discharge device 34. As the arm 39 moves toward the unconnected end of the rheostat 36, the voltage at the electrodes decreases, the discharge current decreases, the dielectric constant and the phase constant increase, the phase wave length decreases and the receiver sensitivity pattern moves in a rotational direction, such as counterclockwise. When the arm 39 rotates from the point of maximum resistance at the unconnected end of the rheostat 36 to the point of minimum resistance adjacent thereto the current in the discharge tube 32 changes rapidly from minimum to maximum value and the receiver response pattern sweeps rapidly back to its initial position. The general horizontal location of the scanned sector can be adjusted by the variable resistance 38 which controls the operating level of the ionizing current within the discharge tube 34.

The scanning frequency is obviously controlled by the speed at which the movable arm 39 is rotated by the motor 10 through the gear trains 11 and 40, and is preferably in the neighborhood of 15 or 20 times the transmitting antenna scanning frequency. Since the receiving antenna 4 is supported in a horizontally extending position, the received maximum response pattern, which is preferably also fan-shaped due to a proper construction and spacing of the antenna elements 32 and of the reflector 46, scans in a substantially horizontal direction. The oscillation of this receiver response pattern is correlated to the movement of the electron beam of the cathode ray tube 5 by the rotation of movable arm 42 of the potentiometer 41 which is properly constructed, in the light of designing principles previously discussed in relation to the construction of potentiometer 17, to produce a saw-toothed voltage across the vertically extending deflecting plates 23 and 45 which causes a synchronized horizontal deflection of the electron beam.

The movement of the electron beam of the cathode ray tube 5 is therefore the result of the instantaneous vertical and horizontal deflecting components which, in turn, depend upon the positions of movable arms 18 and 42 respectively. Since the instantaneous vertical and horizontal deflecting components also represent the instantaneous vertical and horizontal positions of the radiated and received energy patterns respectively, the movement of the electron beam also represents the movement of the field of intersection between the radiated and received energy patterns.

It is evident that an echo signal will be received only when an object is located somewhere within this region of intersection. Since the receiving antenna is scanning horizontally at a much faster rate than the vertical scanning action of the transmitting antenna, the region of intersection sweeps horizonally at slowly changing elevation levels and thereby scans throughout the entire volume of a sector limited only by the width of the energy patterns and the magnitude of the scanning angles.

Whenever the region of intersection of the radiated and received energy patterns sweeps across an object, an echo signal is received and applied to the grid 26 of the cathode ray tube 5 through the range intensity unit and causes a spot of brilliant intensity to appear upon the cathode ray tube screen. Since the position of this spot on the screen corresponds to the position of region of intersection of the transmitted and received energy patterns, the screen may easily be calibrated to indicate the true bearing of the object with respect both to azimuth and elevation.

It will be appreciated that although, for reasons of simplicity and economy, I preferably employ a plurality of mechanical driven rheostats, such as rheostats 17, 36 and 41, to accomplish the correlation between the scanning action of the antennas and the movement of the cathode ray tube electron beam, many other mechanical and electronic synchronization systems, well known to the art, may alternatively be provided. It will also be appreciated that although I preferably apply a sawtooth shaped voltage to the electrodes of the discharge tube 34 in order to produce a conventional periodic sweeping movement of the receiving energy pattern, many other wave shapes of voltage, such as a simple sine wave, for example, may alternatively be applied to the discharge tube in order to produce other scanning motions of the received energy pattern, such as a simple oscillatory motion. Correspondingly shaped voltages must, of course, be applied to the deflecting plates of the cathode ray tube 5 in order to obtain a proper correlation between the scanning movement of the antenna and the deflection of the electron beam.

It is therefore to be understood that although I have shown a particular embodiment of my invention, many modifications may be made and I intend, by the appended claims, to cover all such modifications that fall within the true spirit and scope of my invention.

What I claim as new and desire to secure by Letters Patent of the United States is:

1. A radar scanning system comprising a transmitting antenna, a receiving antenna supported adjacent said transmitting antenna and facing in the same general direction, said receiving antenna comprising a wave guide having an array of electromagnetic wave receiving elements spaced along the length of said guide and adapted to excite said guide in response to electromagnetic waves incident upon said array, said receiving antenna having a directional electromagnetic wave response pattern, means for producing a beam of ultra high frequency electromagnetic energy radiated from said transmitting antenna, means for oscillating said radiated beam in a direction perpendicular to the longitudinal axis of said wave guide, means for producing a region of electrically charged particles within said wave guide and substantially co-extending with said antenna elements along the length of said guide which controls the propagation characteristics of said guide, and means for controlling the density of said electrically charged region in accordance with a predetermined controlling influence whereby said receiving antenna response pattern is varied in a direction parallel to the longitudinal axis of said guide in order to produce determinable regions of intersection with said radiated beam.

2. A radar scanning system comprising a transmitting antenna, a receiving antenna supported adjacent said transmitting antenna and facing in the same general direction, said receiving antenna comprising a wave guide having a linear array of electromagnetic wave receiving elements mounted in spaced relation on said guide, said antenna elements being constructed and arranged to induce electromagnetic wave propagation within said guide responsive to electromagnetic waves incident upon said array from a determinable narrow spatial sector comprising the response pattern of said receiving antenna, means for producing a beam of ultra high frequency electromagnetic energy radiated from said transmitting antenna, means for oscillating said radiated beam in a plane perpendicular to the longitudinal axis of said wave guide at a determinable oscillation frequency, means for producing a region of ionized particles within said wave guide and substantially co-extending with said antenna elements along the length of said guide which controls said receiving antenna response pattern, and means for periodically increasing and decreasing the amount of ionization within said region at a substantially higher frequency than said radiated beam oscillation frequency thereby to produce a rapidly moving region of intersection between said radiated beam and said receiving antenna response pattern.

3. A receiver scanning system comprising a receiving antenna including a wave guide and a linear array of ultra high frequency electromagnetic wave receiving elements spaced along the length of said wave guide, said receiving elements being constructed and arranged to excite said wave guide in response to incident electromagnetic waves, said receiving antenna having a directive response pattern, means for producing a region of ionized particles within said wave guide substantially co-extending with said antenna elements along the length of said guide, and means for controlling the magnitude of ionization of said region thereby to control the dielectric constant within said wave guide which controls the direction of said antenna response pattern.

4. A receiver scanning system comprising a wave guide, a linear array of electromagnetic wave receiving elements, mounted in spaced relation along the length of one side of said wave guide, said receiving elements having stubs extending within said wave guide to induce electromagnetic wave propagation within said guide responsive to electromagnetic waves incident upon said array, said induced wave having substantial energy only when electromagnetic waves are incident upon said array from a narrow spatial sector constituting the antenna response pattern, a gas-filled electric discharge device within said guide and substantially co-extending with said antenna elements along the length of said guide, means for producing a gas ionizing current within said discharge device, and means for varying the magnitude of said ionizing current thereby to control the direction of said antenna response pattern.

5. A receiver scanning system comprising a receiving antenna having a wave guide and a linear array of electromagnetic wave receiving elements mounted in spaced relation along the length of said wave guide and extending thereinto to excite said wave guide in response to electromagnetic waves incident upon said array, said receiving antenna having a directive response pattern, means for producing a region of electrically charged particles within said guide substantially co-extensive with antenna elements along the length of said guide, means for increasing and decreasing the density of said electrically charged region in a cyclical manner at a relatively high frequency thereby to cause said response pattern to scan through a determinable spatial sector at a relatively high scanning frequency, a cathode ray discharge device, and means for synchronizing the movement of the discharge of said cathode ray device to the movement of said response pattern.

References Cited in the file of this patent

UNITED STATES PATENTS

| | | |
|---|---|---|
| 2,047,930 | Linder | July 14, 1936 |
| 2,106,770 | Southworth et al. | Feb. 1, 1938 |
| 2,408,425 | Jenks et al. | Oct. 1, 1946 |